(12) United States Patent
Miyabe (10) Patent No.: US 7,703,569 B2
(45) Date of Patent: Apr. 27, 2010

(54) MOTORCYCLE

(75) Inventor: Toshimasa Miyabe, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 723 days.

(21) Appl. No.: 11/549,866

(22) Filed: Oct. 16, 2006

(65) Prior Publication Data
US 2007/0089921 A1 Apr. 26, 2007

(30) Foreign Application Priority Data
Oct. 17, 2005 (JP) ............................. 2005-302070

(51) Int. Cl.
*B62D 61/02* (2006.01)
*B62K 11/04* (2006.01)
(52) U.S. Cl. ...................... 180/219; 123/470
(58) Field of Classification Search ................. 180/219, 180/225, 228, 229, 230, 68.3, 69.4; 123/472, 123/470
See application file for complete search history.

(56) References Cited

U.S. PATENT DOCUMENTS

| 6,192,865 | B1 * | 2/2001 | Hori et al. ................... | 123/470 |
| 2004/0124029 | A1 * | 7/2004 | Takenaka et al. ............. | 180/291 |
| 2004/0171449 | A1 | 9/2004 | Oishi et al. | |
| 2006/0020385 | A1 * | 1/2006 | Kakinuma ................... | 701/112 |
| 2006/0042603 | A1 * | 3/2006 | Fukami et al. ............... | 123/472 |
| 2006/0066092 | A1 | 3/2006 | Miyabe | |
| 2006/0207571 | A1 * | 9/2006 | Hattori ........................ | 123/494 |
| 2007/0028598 | A1 * | 2/2007 | Futakuchi et al. ............. | 60/285 |

FOREIGN PATENT DOCUMENTS

| EP | 1186526 A2 | 3/2002 |
| EP | 1319591 A1 | 6/2003 |
| EP | 1526024 A2 | 4/2005 |
| FR | 2664227 A1 | 1/1992 |
| JP | 11336538 A | 12/1999 |
| JP | 2002-266724 | 9/2002 |
| JP | 2002266724 A | 9/2002 |

OTHER PUBLICATIONS

European Search Report for corresponding European Application No. 06021652.0 lists the references above.

* cited by examiner

*Primary Examiner*—Anne Marie M Boehler
(74) *Attorney, Agent, or Firm*—Keating & Bennett, LLP

(57) ABSTRACT

A motorcycle with a fuel injection valve oriented to the umbrella back of an intake valve to improve engine performance. An engine is mounted in a lower portion of a leg shield panel member) that forms a stride part. An intake passage is connected to a forward-tilted cylinder head of the engine and extends backward in the lower side of the leg shield. A throttle body into which a throttle valve is built is interposed in the vicinity of an engine connection part of the intake passage. A fuel injection valve is disposed inside space surrounded by the throttle body, the cylinder head and the leg shield when viewed from the side of the motorcycle.

6 Claims, 7 Drawing Sheets

MOTORCYCLE

RELATED APPLICATIONS

This application claims the benefit of priority under 35 USC 119 of Japanese patent application no. 2005-302070, filed on Oct. 17, 2005, which application is hereby incorporated by reference in its entirety.

BACKGROUND OF THE INVENTION

1. Field of the Invention

The present invention relates to a motorcycle having a stride part between a head pipe and a seat for facilitating the stride of a rider during loading and unloading.

2. Description of Related Art

Recent motorcycles adopt a method for controlling fuel supply by a fuel injection valve according to a run state in order to improve properties of exhaust gas, fuel efficiency or engine output. To arrange such a fuel injection valve, an intake passage connected to a cylinder head is extended to the front of the motorcycle and also is connected to an air cleaner. The fuel injection valve is stood in a substantially perpendicular orientation in the downstream end of the intake passage. See, for example, JP-A-2002-266724.

In a motorcycle adopting a structure in which a fuel injection valve is stood and arranged in the downstream end of an intake passage extending from a cylinder head to the front of the vehicle, an injection direction of the fuel injection valve is oriented to a ceiling wall of an intake port and the fuel cannot be injected toward the essentially desirable umbrella back of an intake valve, which may negatively impact engine performance.

Also, when such a fuel injection valve is stood and arranged in a motorcycle comprising a backward descending panel member for facilitating loading and unloading of a rider, the panel member must be arranged in a high position in order to avoid interference with the fuel injection valve, which may negatively impact the capability of loading and unloading.

SUMMARY OF THE INVENTION

The invention is implemented in view of these circumstances and provides a motorcycle with a fuel injection valve oriented to the umbrella back of an intake valve to improve engine performance.

A motorcycle according to the invention includes a panel member forming a stride part for facilitating a stride of a rider at a time of loading and unloading. The stride part is formed between a seat and a head pipe for supporting a steering shaft. An engine is mounted in a lower portion of the panel member that forms the stride part. An intake passage is connected to a cylinder head coupled to a forward-tilted cylinder of the engine and extends backward below the panel member. A throttle body into which a throttle valve is built is interposed in a vicinity of an engine connection part of the intake passage. A fuel injection valve is disposed inside space surrounded by the throttle body, the cylinder head and the panel member when viewed from the side of the motorcycle.

According to this structure of the invention, the fuel injection valve is arranged in a region having sufficient space. As a result, the fuel injection valve can be oriented to the umbrella back of an intake valve to improve engine performance. That is, the panel member forming the stride part is located higher as the panel member is located in the front side, so that the fuel injection valve is arranged in empty space between the forward-tilted cylinder head and a front side portion of the panel member. As a result, the fuel injection valve is arranged without heightening the position of the panel member and is oriented to the umbrella back of the intake valve while ensuring maintaining loading and unloading capability.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Embodiments of the invention are described below based on the accompanying drawings.

FIGS. 1-5 are diagrams describing a motorcycle according to a first embodiment of the invention. The terms "forward", "backward", "left" and "right" in the following description mean forward, backward, left and right from the perspective of a rider sitting on the seat.

Figure 1:
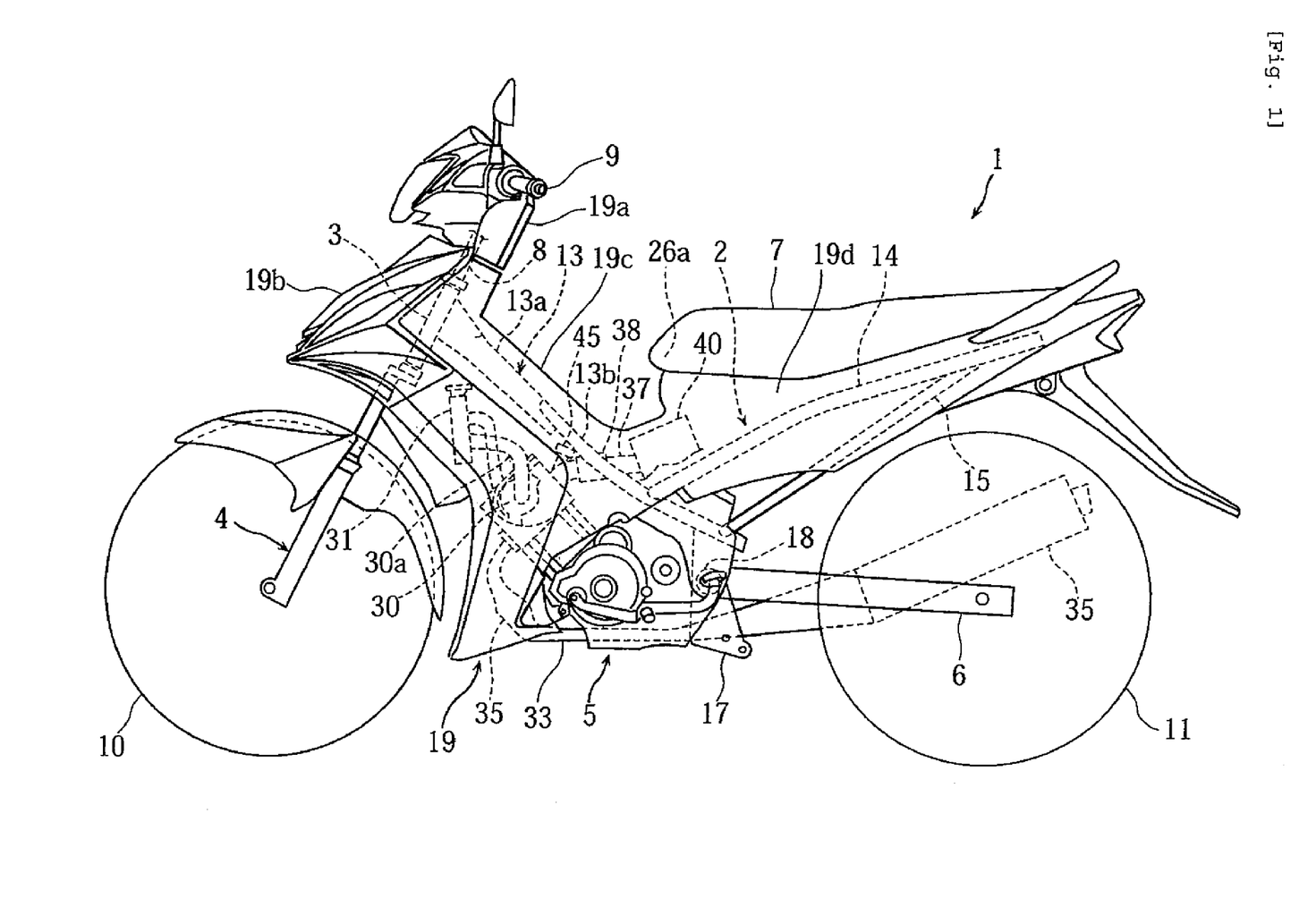
FIG. 1 is a side view of a motorcycle according to a first embodiment of the invention.

In the drawings, numeral 1 is a motorcycle comprising a vehicle body frame 2 of an under bone type, a front fork 4 pivoted by a head pipe 3 fixed in a front end of vehicle body frame 2, an engine 5 suspended and supported in the center of vehicle body frame 2, a rear arm 6 vertically swingably pivoted in the back side of engine 5 of vehicle body frame 2, and a seat 7 for two arranged on vehicle body frame 2.

A front wheel 10 is axially supported in the lower end of front fork 4 and a rear wheel 11 is axially supported in the back end of rear arm 6.

A steering shaft 8 is axially supported in head pipe 3 through a bearing (not shown). Front fork 4 is fixed in the lower end of steering shaft 8 and a steering handle 9 is fixed in the upper end.

Figure 2:
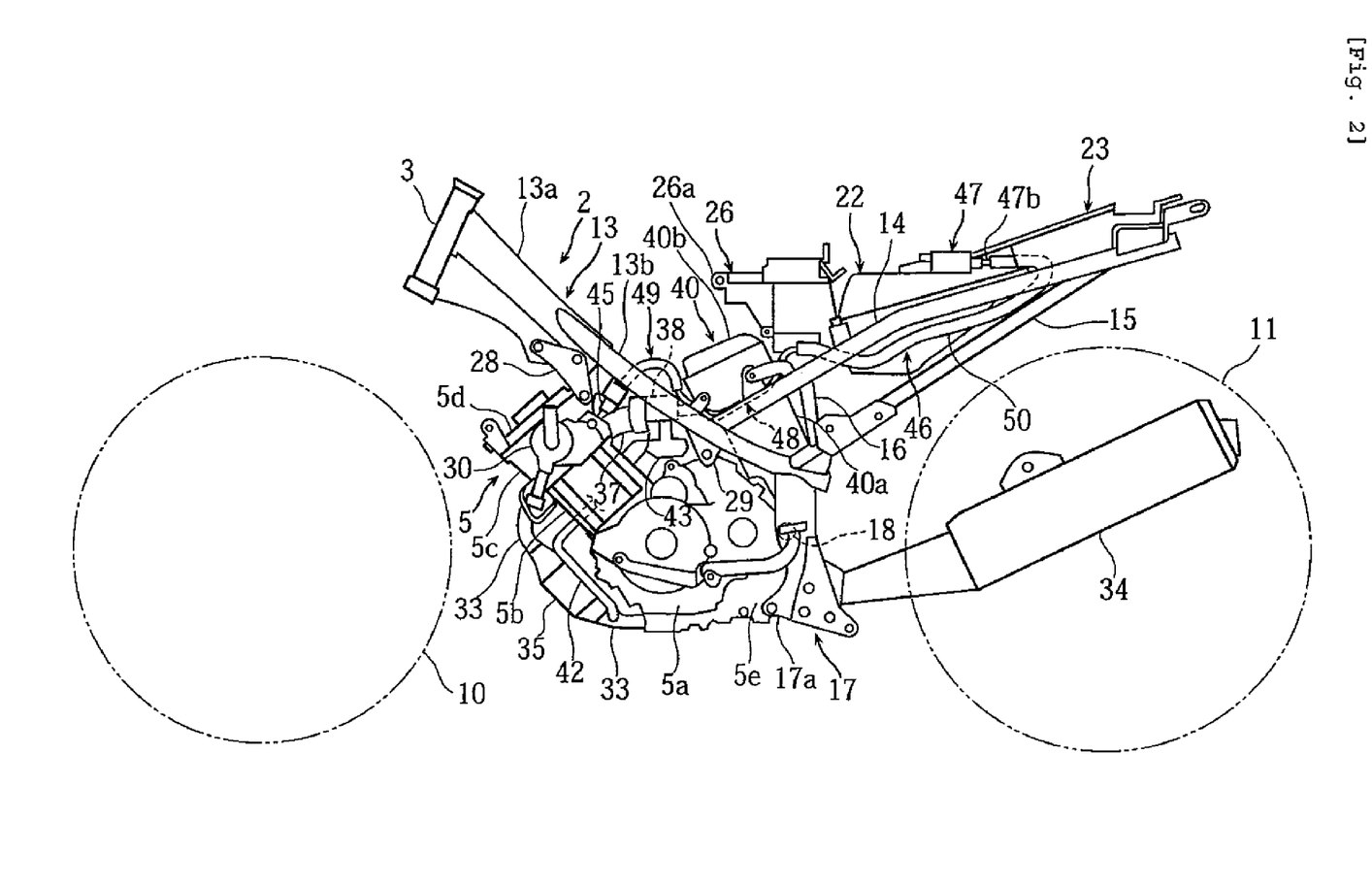
FIG. 2 is a side view of a frame member of the motorcycle.

Vehicle body frame 2 comprises a frame member 13 which is connected to head pipe 3 and extends toward a lower portion of seat 7 in a backward descending state.

Frame member 13 has one main pipe 13a which is connected to head pipe 3 and extends to a backward oblique lower portion of the vehicle, and one pair of left and right side pipes 13b, 13b which are connected to the back end of main pipe 13a and extend to a backward oblique lower portion so as to be located in a lower portion of seat 7 while expanding to the outside in a width direction of the vehicle.

An axis line of main pipe 13a and a center line of the vehicle width direction of left and right side pipes 13b coincide with a vehicle body center line passing through an axis line of head pipe 3.

The front ends of left and right seat rails 14, 14 extending in a backward oblique upper direction of the vehicle are connected to the backs of left and right side pipes 13b. Also, the back ends of left and right side pipes 13b and the back ends of seat rails 14 are joined by left and right back stays 15, 15. Further, the fronts of seat rails 14 and left and right back stays 15 are mutually joined by left and right longitudinal pipes 16, 16.

A rear arm bracket 17 extending downward is connected to the portion to which back stays 15 of the back ends of left and right side pipes 13b are connected. Rear arm 6 is supported in rear arm bracket 17 by a pivot shaft 18.

Vehicle body frame 2 is covered with a vehicle body cover 19. Vehicle body cover 19 has a handle cover 19a for covering the outer circumference of steering handle 9, a front cover 19b for covering a front side portion of head pipe 3, a leg shield 19c (panel member) for covering the upper side and the left and right sides of frame member 13 between seat 7 and head pipe 3, and a side cover 19d for covering the downward circumference of seat 7.

Leg shield 19c forms a backward descending stride part which inclines along frame member 13 in a backward descending state and facilitates a stride of a rider at the time of loading and unloading.

A fuel tank 22 is arranged downward of seat 7 and between left and right seat rails 14. A glove compartment 23 is arranged behind fuel tank 22. A battery box 26 in which a battery and fuse unit (not shown) are received is arranged in front of fuel tank 22. Battery box 26 is fixed on left and right seat rails 14. Also, a hinge part 26a for vertically rotatably supporting seat 7 is integrally formed in a front wall of battery box 26.

Fuel tank 22 comprises a fuel inlet 24d formed in an upper wall of a tank body 24 made by mutually bonding flange parts 24c of a lower tank 24a and an upper tank 24b. Fuel inlet 24d is openably blocked by a fuel cap 25. Tank body 24 is elastically supported in left and right seat rails 14 through elastic bushings 27 attached to each of the corners of flange parts 24c.

Engine 5 is a water cooling type four-cycle one-cylinder engine mounted with a cylinder axis line A forward tilted. Engine 5 has a general structure in which a cylinder block 5b is coupled to an upper mesh surface of a crankcase 5a in which a crankshaft (not shown) is held in a width direction of the vehicle. A cylinder head 5c is coupled to an upper mesh surface of cylinder block 5b and a head cover 5d is attached to cylinder head 5c. A transmission case part 5e in which a transmission unit (not shown) is held is integrally formed in the back side of crankcase 5a.

Cylinder head 5c is bolted and fixed to main pipe 13a through left and right front side suspension brackets 28, and an upper wall of crankcase 5a is bolted and fixed to left and right side pipes 13b through an intermediate suspension bracket 29. The lower end of a back side wall of transmission case part 5e is bolted and fixed to a lower side bracket 17a of rear arm bracket 17.

A cooling water pump 30 is arranged in a left wall of cylinder head 5. Cooling water pump 30 is connected to a radiator 31 arranged in the oblique front of engine 5 through a cooling water hose 30a.

An exhaust system of engine 5 has the following structure. An exhaust tube 33 in communication with an exhaust port (not shown) is connected to a front side wall of cylinder head 5c. Exhaust tube 33 extends downward from cylinder head 5c and bends backward therefrom and extends backward through a lower portion of crankcase 5a. A muffler 34 arranged in the right side of rear wheel 11 is connected to the downstream end of exhaust tube 33. Also, a catalyst 35 is interposed in the upstream side of exhaust tube 33.

Figure 3:
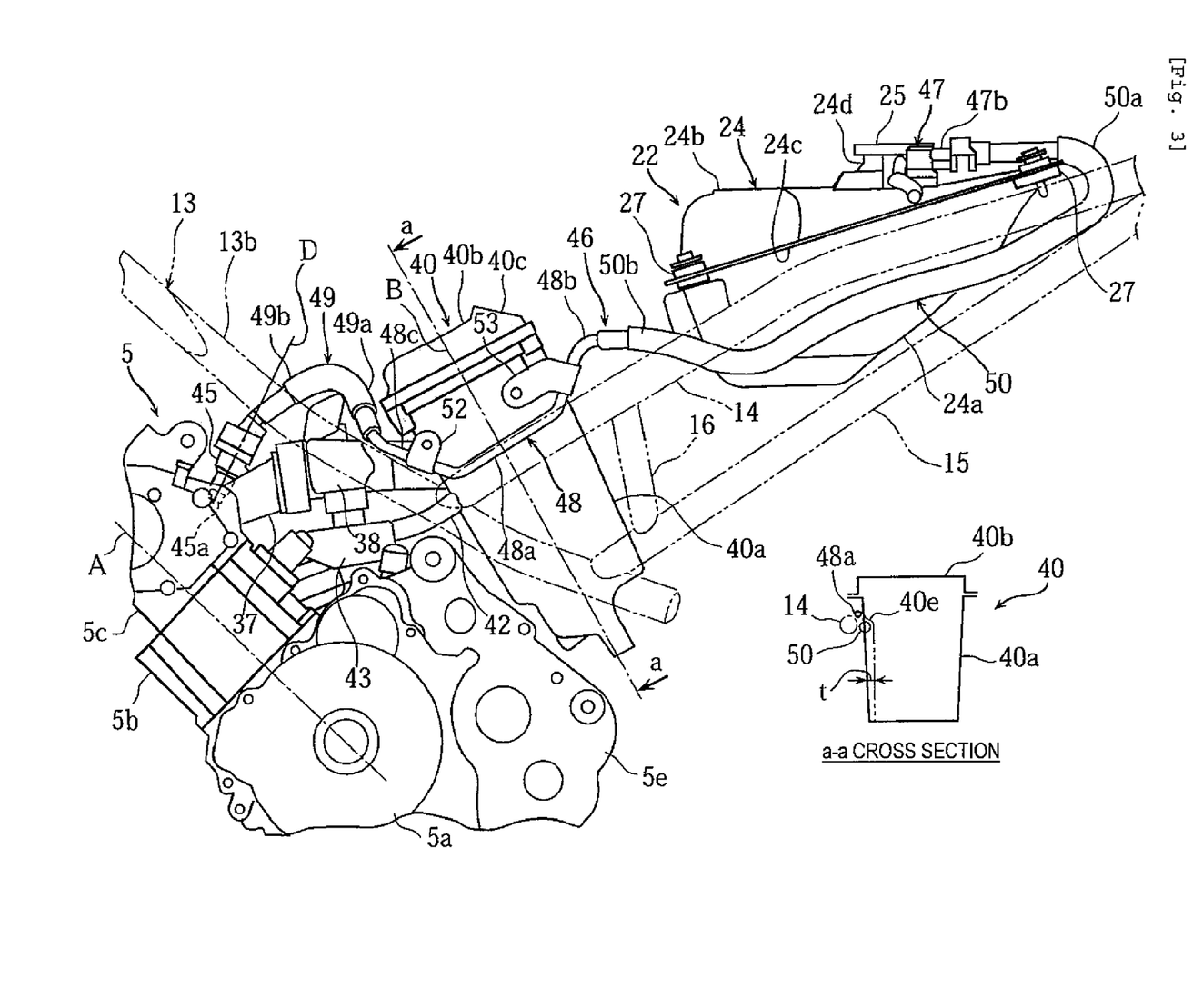
FIG. 3 is a side view of a fuel supply device disposed in the frame member.

An intake system of engine 5 has the following structure. An intake tube 37 in communication with an intake port (not shown) is connected to a back side wall of cylinder head 5c. Intake tube 37 extends substantially horizontally from cylinder head 5c to the back of the vehicle. A throttle body 38 into which a throttle valve (not shown) is built is interposed in an intermediate part of intake tube 37. An air cleaner 40 is connected to the back end of intake tube 37. Air cleaner 40 is set at a predetermined capacity capable of securing an intake amount at a time of maximum output of engine 5.

Air cleaner 40 comprises a cleaner body 40a with a bottomed rectangular parallelepiped shape extending in a vertical direction and a lid member 40b detachably attached to an upper end opening of cleaner body 40a. Cleaner body 40a is manufactured using a metal mold in which a die cutting direction is a vertical direction (direction of an axis line B). That is, in cleaner body 40a, a dimension of the upper end opening becomes larger than that of the bottom in a width direction and forward and backward directions of the vehicle.

An air filter (not shown) is arranged inside cleaner body 40a and intake tube 37 is connected to a front wall of cleaner body 40a. An inlet port 40c is formed in a rear surface of lid member 40b.

Air cleaner 40 is arranged with axis line B forward tilted so as to be substantially parallel to cylinder axis line A. Cleaner body 40a is received inside space formed in a connection part between left and right side pipes 13b, 13b and left and right seat rails 14, 14, and approximately the upper half of cleaner body 40a protrudes upward from left and right seat rails 14.

A secondary air supply system of engine 5 has the following structure. Air cleaner 40 is communicated and connected to a downstream side portion of catalyst 35 of exhaust tube 33 by a secondary air supply hose 42 for supplying secondary air to the inside of exhaust tube 33.

A reed valve (not shown) opened and closed by pulsation of the exhaust system and a resonator 43 for attenuating a predetermined resonance frequency in the upstream side of the reed valve are interposed in secondary air supply hose 42. The reed valve is arranged in the right side of cylinder block 5b and resonator 43 is arranged in a left lower portion of throttle body 38 and is mounted and fixed in throttle body 38.

Figure 4:
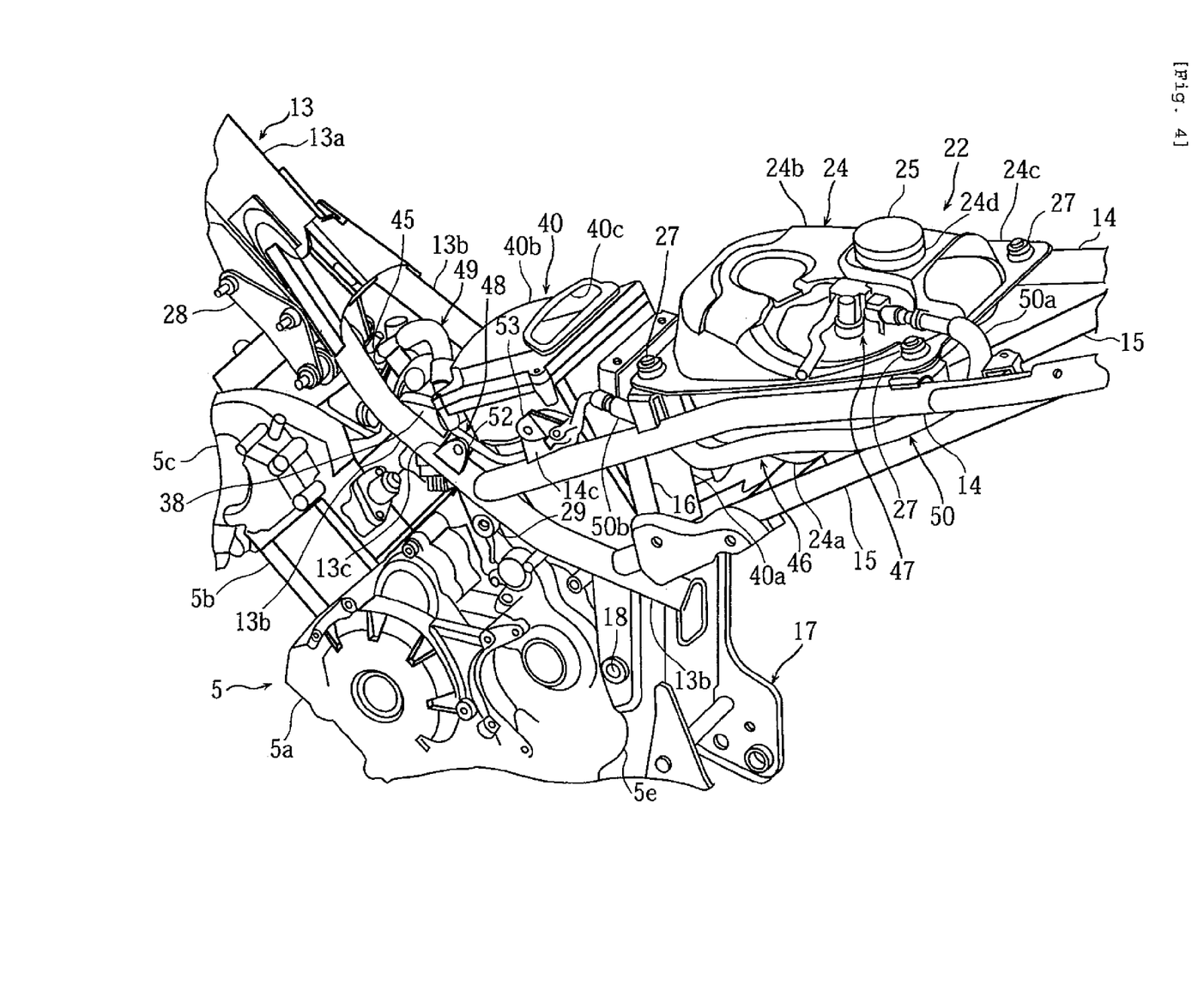
FIG. 4 is a perspective view from the oblique back of the fuel supply device.

A fuel supply device is disposed in engine 5. This fuel supply device comprises fuel tank 22 arranged in the back of air cleaner 40, a fuel injection valve 45 which is arranged in the front of air cleaner 40 and is connected to engine 5, a fuel hose 46 for making connection between fuel injection valve 45 and fuel tank 22, and a fuel pump 47 for pressurizing fuel inside fuel tank 22 and supplying the fuel to fuel injection valve 45.

Fuel pump 47 is received and arranged inside fuel tank 22. An inlet (not shown) of fuel pump 47 is located in the bottom of the tank and an outlet 47b protrudes backward from an upper wall of tank body 24.

Fuel hose 46 is connected to outlet 47b of fuel pump 47 and extends forward through the left side of fuel tank 22 from outlet 47b and is connected to fuel injection valve 45 through the left side of air cleaner 40, and specifically has the following structure.

Figure 5:
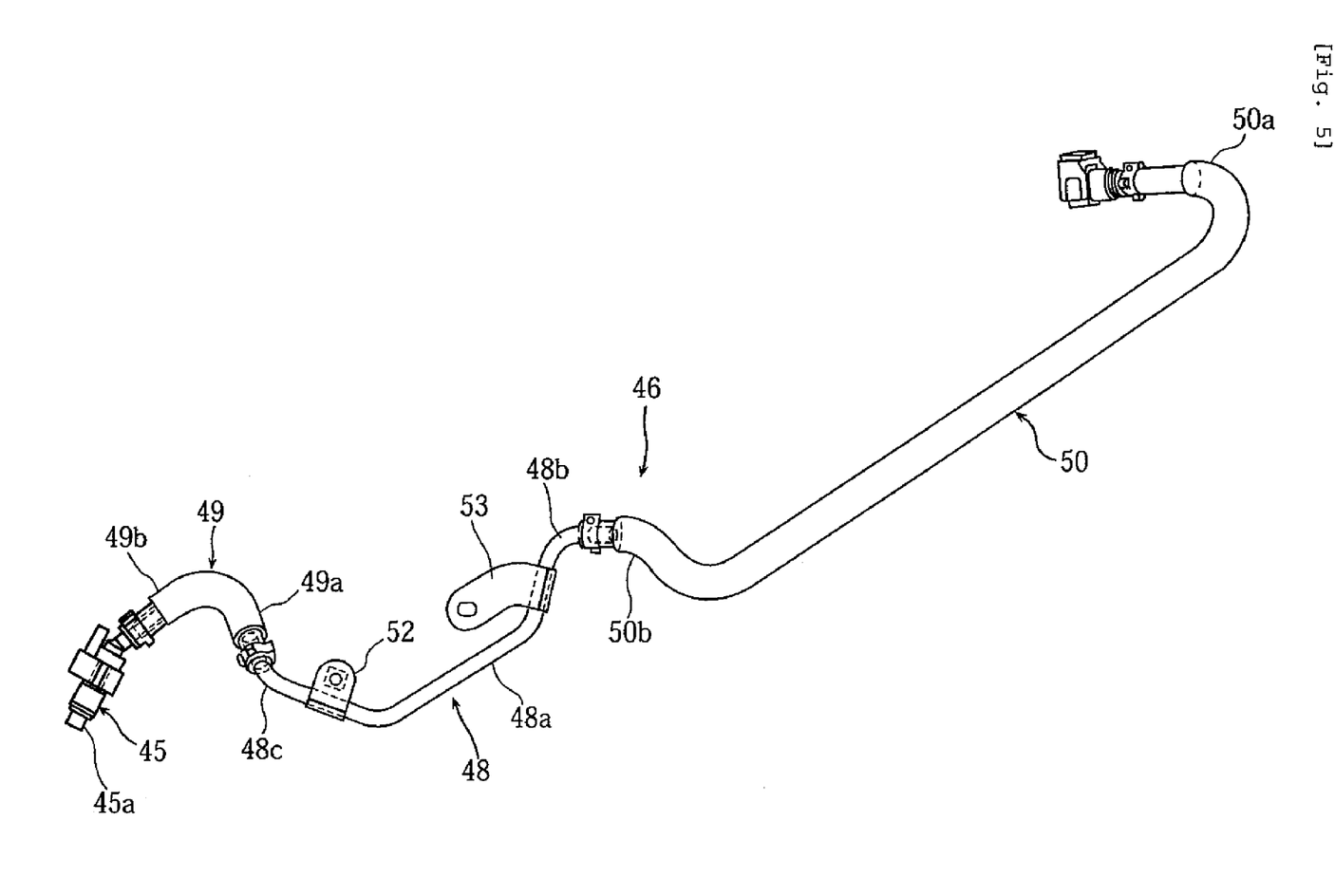
FIG. 5 is a side view of a fuel hose of the fuel supply device.

Fuel hose 46 comprises a thin diameter part 48 cabled so as to pass through the side of air cleaner 40, and front side and back side elastic hose parts 49, 50 connected to both ends of thin diameter part 48.

Thin diameter part 48 is constructed of a metal pipe with an outside diameter of about 8 mm folded and formed in a predetermined shape. An inner circumference surface and an outer surface of the metal pipe are respectively coated with predetermined plating treatment. Also, front side and back side elastic hose parts 49, 50 are constructed of a high-pressure hose having flexibility and an outside diameter about twice that of thin diameter part 48.

Back side elastic hose part 50 is cabled so as to extend in forward and backward directions along lower tank 24*a* of fuel tank 22 between left seat rail 14 and back stay 15. An upstream part 50*a* of elastic hose part 50 is curved and formed so as to turn from the back side of tank body 24 to the front side and is connected to outlet 47*b* of fuel pump 47. Also, a downstream part 50*b* extends forward so as to be located in the front side of lower tank 24*a* and extends so as to be located from the lower side of left seat rail 14 to the upper side and is connected to thin diameter part 48.

Front side elastic hose part 49 is formed with a generally downward curve and is cabled to stride over an upper portion of throttle body 38 forward and backward and to be located above left and right side pipes 13*b*. In front side elastic hose part 49, an upstream part 49*a* is connected to thin diameter part 48 in the back side of throttle body 38 and downstream end 49*b* is connected to fuel injection valve 45 in the front side of throttle body 38. Downstream end 49*b* inclines to the back of the vehicle with respect to an axis line D of fuel injection valve 45 when viewed from the side of the vehicle. Also, this back inclination portion overlaps with side pipe 13*b* when viewed from the side of the vehicle.

Thin diameter part 48 has a straight part 48*a* that passes through the vicinity of a left wall of cleaner body 40*a*, a stand part 48*b* extending from the vicinity of the back edge of cleaner body 40*a* in a backward ascending state following the back end of straight part 48*a*, and a bend part 48*c* extending from the vicinity of the front edge of cleaner body 40*a* to the inside in a forward ascending state following the front end of straight part 48*a*. Front side elastic hose part 49 is connected to bend part 48*c* and back side elastic hose part 50 is connected to stand part 48*b*.

A front bracket 52 and a back bracket 53 are respectively fastened to bend part 48*c* and stand part 48*b* of thin diameter part 48 by brazing etc. Front bracket 52 is bolted and fixed to a side bracket 13*c* bonded to an upper surface of left side pipe 13*b* and back bracket 53 is bolted and fixed to a rail bracket 14*c* bonded to an upper surface of left seat rail 14.

Thin diameter part 48 is cabled so that straight part 48*a* is close to a left wall of cleaner body 40*a* in the inside of left seat rail 14 and becomes parallel to the left wall and left seat rail 14. Then, straight part 48*a* is cabled to be close to the left wall in a direction (vehicle width direction) substantially perpendicular to a die cutting direction (vertical direction) of cleaner body 40*a* with respect to the left wall.

Fuel injection valve 45 is attached to the downstream end of intake tube 37 so as to incline in an oblique backward direction. Fuel injection valve 45 is arranged so that an injection port 45*a* is oriented to the umbrella back of an intake valve (not shown).

Fuel injection valve 45 is located inside space surrounded by throttle body 38, cylinder head 5*c* and leg shield 19*c*, specifically, space below side pipes 13*b* whose upper, left and right sides are covered with leg shield 19*c* when viewed from the side of the vehicle.

Also, fuel injection valve 45 is arranged between left and right side pipes 13*b* in the vicinity of the lower side of a connection part between left and right side pipes 13*b* and main pipe 13*a* when viewed from above the vehicle.

According to the embodiment, intake tube 37 connected to forward-tilted cylinder head 5*c* is extended in a generally horizontal direction backward in the lower side of leg shield 19*c* and fuel injection valve 45 is located inside space surrounded by cylinder head 5*c*, throttle body 38 and leg shield 19*c*, specifically, space below side pipes 13*b* whose upper, left and right sides are covered with leg shield 19*c* when viewed from the side of the vehicle, so that fuel injection valve 45 is arranged in a region having sufficient space and fuel injection valve 45 is arranged so that injection port 45*a* is oriented to the umbrella back of an intake valve and thus engine performance is improved.

That is, fuel injection valve 45 is arranged in empty space formed by side pipes 13*b* extending in an oblique upward direction, cylinder head 5*c* forward tilted and arranged in a lower portion of side pipes 13*b* and intake tube 37 extending in a generally horizontal direction backward from cylinder head 5*c*. As a result, fuel injection valve 45 is advantageously oriented to the umbrella back of the intake valve without heightening an arrangement position of leg shield 19*c* and flexibility for an arrangement layout of fuel injection valve 45 is advantageously increased while ensuring loading and unloading capability.

In the embodiment, fuel injection valve 45 is arranged between left and right side pipes 13*b* in the vicinity of the lower side of a connection part between left and right side pipes 13*b* and main pipe 13*a* when viewed from above the vehicle, so that fuel injection valve 45 is located between a rigid forward-tilted cylinder and the portion with high rigidity of the vehicle body, and damage caused by external force is prevented.

In the embodiment, front side elastic hose part 49 of fuel hose 46 is connected to fuel injection valve 45 so as to incline to the back of the vehicle with respect to axis line D of fuel injection valve 45, and the lower side of leg shield 19*c* is cabled backward, so that protrusion to an upper portion of front side elastic hose part 49 is reduced and an arrangement position of leg shield 19*c* is prevented from heightening. Also, the inclination portion of fuel hose 46 overlaps side pipes 13*b* when viewed from the side of the vehicle, so that a bend of a fuel injection valve connection portion of fuel hose 46 is reduced.

In the embodiment, intake tube 37 is extended in a generally horizontal direction backward to pass between cylinder head 5*c* and left and right side pipes 13*b*, and front side elastic hose part 49 is cabled to stride over the upper side of throttle body 38 forward and backward, so that front side elastic hose part 49 is cabled effectively using empty space of an upper portion of throttle body 38.

In the embodiment, resonator 43 is interposed in secondary air supply hose 42 for supplying secondary air to an exhaust system, and resonator 43 is arranged in the lower side of throttle body 38, so that resonator 43 is arranged using empty space of the lower side of throttle body 38. That is, when a carburetor having a float chamber is arranged, it is difficult to secure an arrangement place of the resonator in a lower portion of the float chamber and it is therefore necessary to secure the arrangement place elsewhere. The periphery of the engine of the invention is formed compactly as compared with such carburetor specifications.

According to the embodiment, a portion of fuel hose 46 for connecting fuel tank 22 to fuel injection valve 45 passing through the vicinity of the side of air cleaner 40 is formed as thin diameter part 48 with a diameter thinner than that of front side and back side elastic hose parts 49, 50, so that an increase in vehicle width is avoided without reducing capacity of air cleaner 40.

Also, the portion passing through the vicinity of air cleaner 40 is formed as thin diameter part 48, so that it is unnecessary to form a recess groove in cleaner body 40*a* while arranging fuel hose 46 to be close in a direction intersecting with a die cutting direction of cleaner body 40*a*, and a decrease in a capacity of air cleaner 40 is avoided.

When a relief 40e is formed in air cleaner body 40a for close arrangement of fuel hose 46 as shown in a cross section taken on line a-a of FIG. 3, a dimension in a vehicle width direction of the die cutting direction upstream side portion (lower side portion) from the relief must be decreased by an amount t of relief 40e and accordingly, capacity is reduced.

Figure 6:
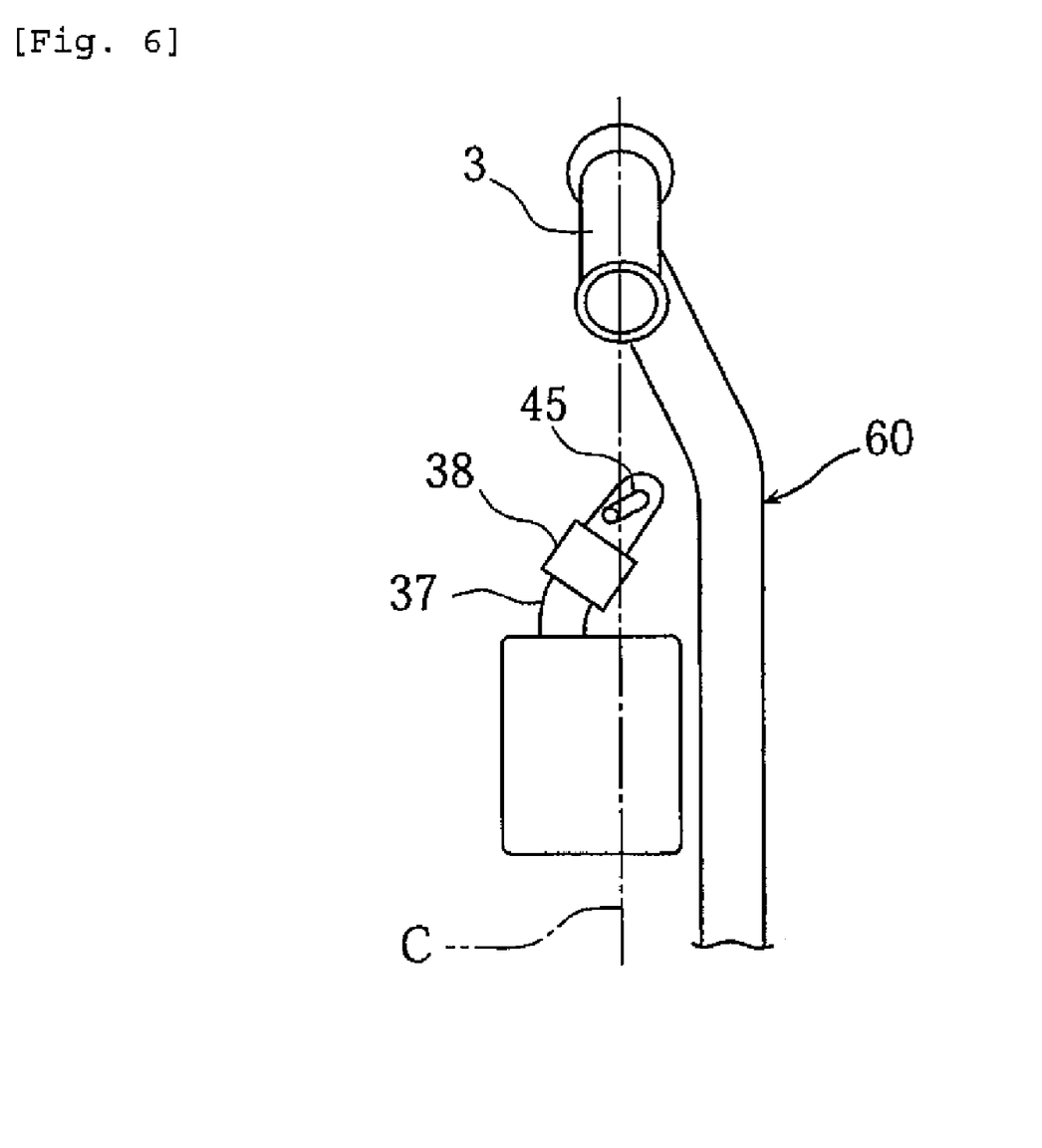
FIG. 6 is a plan view of a frame member according to a second embodiment of the invention.
Figure 7:
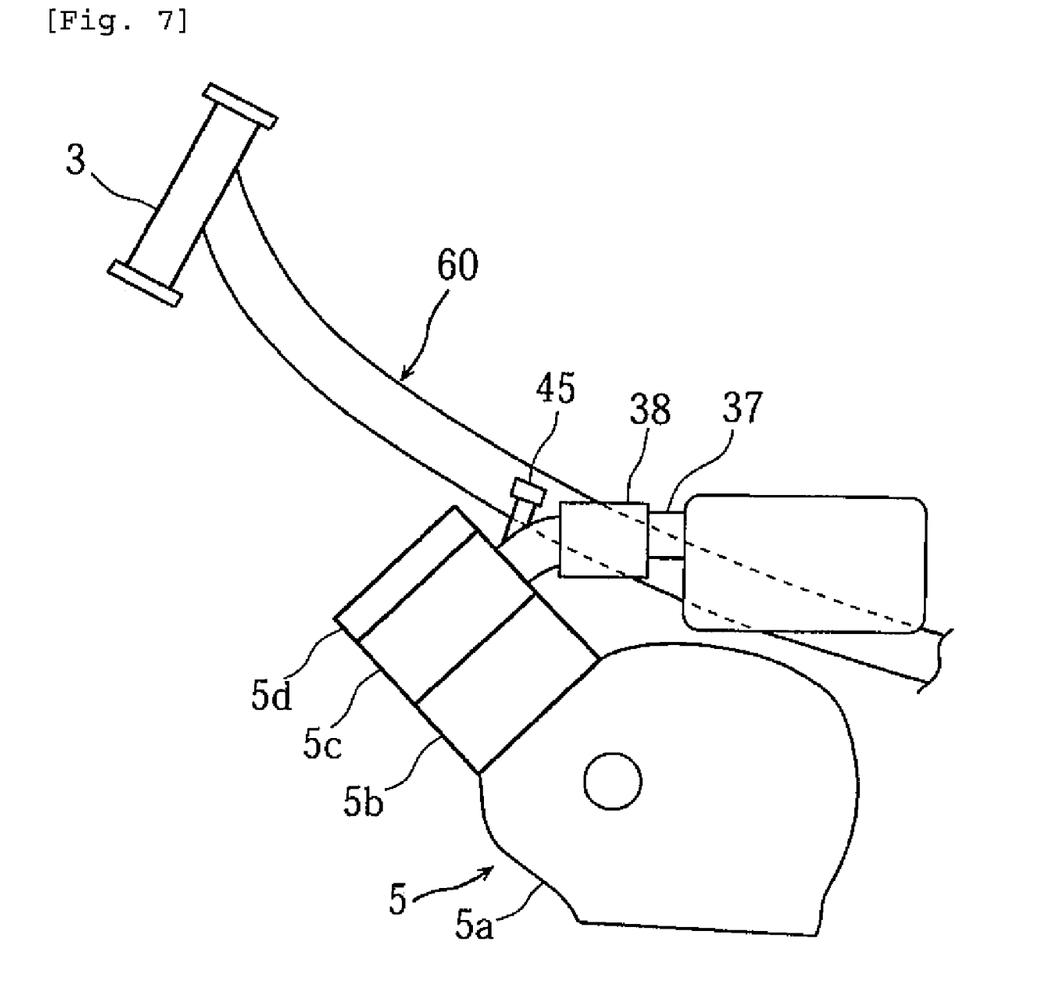
FIG. 7 is a side view of the frame member.

FIGS. 6 and 7 are diagrams describing a motorcycle according to a second embodiment of the invention. In FIGS. 6 and 7, the same numerals as those of FIG. 2 show the same or corresponding parts.

In the motorcycle of the second embodiment, a frame member 60 connected to a head pipe 3 is displaced to one side of a vehicle width direction with respect to a vehicle body center line C passing through an axis line of head pipe 3.

In frame member 60, a leg shield (panel member) (not shown) for covering the upper, left and right sides of frame member 60 is arranged to coincide with vehicle body center line C.

In the lower side of frame member 60, an engine 5 is mounted to coincide with vehicle body center line C. An intake tube 37 connected to a cylinder head 5c of engine 5 extends backward to the other side of the vehicle width direction with respect to vehicle body center line C, and is connected to an air cleaner 40.

A fuel injection valve 45 is located in the other side of frame member 60 substantially on vehicle body center line C when viewed from above the vehicle. Fuel injection valve 45 is located inside space surrounded by the leg shield, a throttle body 38 and cylinder head 5c and overlaps with frame member 60 when viewed from the side of the vehicle.

In the embodiment, fuel injection valve 45 is located in the other side of frame member 60 and displaced to one side of the vehicle width direction when viewed from above, and is located inside space surrounded by the leg shield, throttle body 38 and cylinder head 5c and overlaps with frame member 60 when viewed from the side of the vehicle, so that fuel injection valve 45 is oriented to the umbrella back of an intake valve in a region having sufficient space, and an effect substantially similar to that of the first embodiment is obtained.

The particular embodiments of the invention described in this document should be considered illustrative, rather than restrictive. Modification to the described embodiments may be made without departing from the spirit of the invention as defined by the following claims.

The invention claimed is:

1. A motorcycle comprising:
a panel member forming a stride part for facilitating a stride of a rider at a time of loading and unloading, the stride part being formed between a seat and a head pipe for supporting a steering shaft;
an engine mounted in a lower portion of the panel member that forms the stride part;
an intake passage connected to a cylinder head coupled to a forward-tilted cylinder of the engine, the intake passage extending backward below the panel member;
a throttle body into which a throttle valve is built interposed in a vicinity of an engine connection part of the intake passage;
a fuel injection valve disposed inside space surrounded by the throttle body, the cylinder head and the panel member when viewed from a side of the motorcycle; and
a frame member connected to the head pipe and extending toward a lower portion of the seat in a backward descending state, wherein
the panel member covers the upper, left and right sides of the frame member,
the stride part is in a backward descending state,
the fuel injection valve is disposed inside space surrounded by the frame member, the throttle body and the cylinder head when viewed from the side of the motorcycle,
the frame member has left and right side pipes in at least a part between the head pipe and the seat,
the fuel injection valve is arranged between the left and right side pipes when viewed from above the motorcycle,
the frame member has one main pipe connected to the head pipe and extending to a backward oblique lower portion, and left and right side pipes connected to a back end of the main pipe and extending to a lower portion of the seat while expanding in a vehicle width direction, and
the fuel injection valve is arranged between the left and right side pipes in a vicinity of a connection part between the side pipes and the main pipe when viewed from above the motorcycle.

2. The motorcycle as claimed in claim 1, further comprising:
a fuel supply hose connected to the fuel injection valve and inclining to a back of the motorcycle with respect to an axis line of the fuel injection valve and extending backward underneath the panel member.

3. The motorcycle as claimed in claim 2, wherein the fuel supply hose has a portion overlapping with the frame member when viewed from the side of the motorcycle.

4. The motorcycle as claimed in claim 1, wherein the intake passage extends to a back of the motorcycle and passes between the left and right side pipes.

5. The motorcycle as claimed in claim 3, wherein the fuel supply hose connected to the fuel injection valve extends backward over the upper side of the throttle body.

6. The motorcycle as claimed in claim 4, wherein the fuel injection valve overlaps with the frame member when viewed from the side of the motorcycle.

* * * * *